Sept. 15, 1942.　　　R. H. BOUND ET AL　　　2,296,017
UNILATERALLY SUPPORTED RESILIENT WHEEL MOUNTING
FOR AIRCRAFT UNDERCARRIAGES
Filed May 15, 1939　　　7 Sheets-Sheet 1

Inventor:
Rowland H. Bound
George H. Dowty
By
Charles L. Reynolds
Atty.

Sept. 15, 1942.  R. H. BOUND ET AL  2,296,017
UNILATERALLY SUPPORTED RESILIENT WHEEL MOUNTING
FOR AIRCRAFT UNDERCARRIAGES
Filed May 15, 1939                    7 Sheets-Sheet 5

Inventor
Rowland H. Bound
George H. Dowty
By
Charles L. Reynolds
Atty.

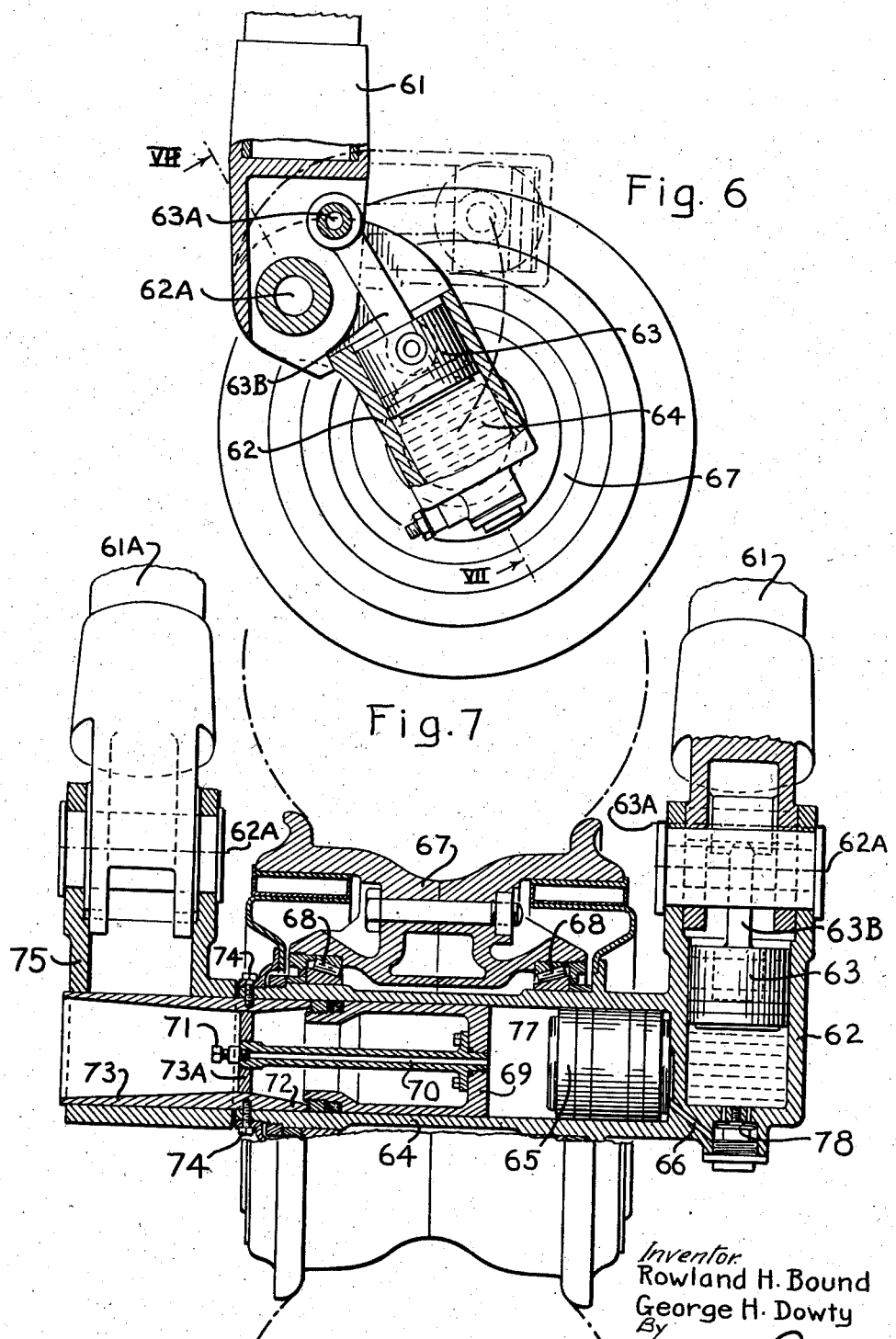

Sept. 15, 1942.   R. H. BOUND ET AL   2,296,017
UNILATERALLY SUPPORTED RESILIENT WHEEL MOUNTING
FOR AIRCRAFT UNDERCARRIAGES
Filed May 15, 1939   7 Sheets-Sheet 7

Inventor.
Rowland H. Bound
George H. Dowty
By
Charles L. Reynolds
Atty.

Patented Sept. 15, 1942

2,296,017

UNITED STATES PATENT OFFICE 2,296,017

UNILATERALLY SUPPORTED RESILIENT WHEEL MOUNTING FOR AIRCRAFT UNDERCARRIAGES

Rowland Henry Bound and George Herbert Dowty, Cheltenham, England, assignors to Dowty Equipment Limited, a limited company Application May 15, 1939, Serial No. 273,624
In Great Britain June 3, 1938

24 Claims. (Cl. 244—104)

This invention relates to aircraft undercarriages or alighting gear, and more particularly to a resilient wheel mounting therefor, that is, one in which a wheel is attached to the aircraft, or to an upright leg which constitutes part of the undercarriage, through the medium of a shock absorbing mounting unit which transmits all the landing or taxying loads, from the wheel to the substantially rigid undercarriage structure, including such upright leg or legs, or like strut means, and in which the entire support of the wheel is constituted by or through the shock absorbing mounting, which includes elements constituting a triangle deformable under the applied loads.

The present invention is more particularly in the nature of an improvement upon and an extension of the invention disclosed in Patent No. 2,174,315, dated September 26, 1939, to George Herbert Dowty, one of the joint applicants herein, the application for which was copending with this application.

It is one of the advantages of the prior construction, disclosed in the patent referred to above, that a wheel mounting incorporating a shock absorber means could be formed as a unit, adapted for use under widely varying conditions and to absorb widely different loads, and was capable of being attached in a simple manner to various types of strut means, so that the structure lent itself admirably to standardization and to quantity production, in that the structure, with little or no change other than adjustment or resetting, was capable of use under such widely varying circumstances and with widely different structures, and where the loads or operating conditions might vary materially. It is an object of the present invention to retain the advantages of the former construction to the full, and indeed to increase such advantages or to widen their scope by providing a unit which is of even simpler and therefore cheaper construction, and more readily made. In particular it is an object of the present invention to devise a structure of the general type indicated, which may be applicable where, for conditions of convenience, design, simplicity, weight reduction or otherwise, it may be desirable to support the ground-engaging member from a single strut means, or in a simple manner from two separate strut means, and in any case through the intermediary of a simple shock absorber means such as may be carried by or connected to one such strut means.

More particularly it is an object of the present invention to provide such a wheel mounting incorporating a piston-and-cylinder type of shock absorber, in which the working cylinder and piston are disposed externally of the wheel, and in which a resilient chamber, such as an air chamber for springing the normal loads while traveling over the ground, may be either formed as an extension of the working cylinder or, preferably, disposed within and axially of the wheel spindle, thereby gaining in simplicity and conserving weight.

It is a further object to provide a structure of the general type indicated, and which incorporates a flow restricting valve, or orifice, for dynamically absorbing the heavy shocks of landing, which valve is so located, by reason of the structure adopted for the shock absorbing means, that the valve is readily accessible for inspection, adjustment, repair or replacement.

It is a further object to provide a structure of the general type indicated, which incorporates a piston-and-cylinder shock absorbing mechanism, in which the piston itself may serve as the air chamber, and in which further, and whether the piston is or is not the air cylinder, the piston may be connected either directly by a link or by a sliding block arrangement to the upright leg of the undercarriage structure.

It is a further specific object to provide a wheel mounting of the type indicated, primarily designed for unilateral connection to the shock absorber leg, but which may be adapted with only the addition of simple elements, and without structural changes of consequence in the wheel mounting or shock absorber itself, to a bilateral support or connection, this connection including a dummy lever.

Still a further object is to provide such a structure which, notwithstanding its range of usefulness, may be made lighter in weight and at less cost, and which may be more easily constructed, more readily maintained, and which will have improved wearing qualities.

With these objects in mind, and others as will appear hereafter, the invention comprises the novel parts of the aircraft alighting gear or of the wheel mounting, and the novel combination and arrangement of such parts relative to each other and relative to other parts of the aircraft undercarriage, all as shown in the accompanying drawings, and as will be described in this specification, and as will be more particularly defined by the claims terminating the same.

In the accompanying drawings the invention is shown in various forms, which are intended to be illustrative of the principles of the invention, but not as exclusive of other or modified forms.

Figure 6 is a view similar to Figure 1, and Figure 7 is a section similar to Figure 2, illustrating a further modified arrangement including a dummy lever.

It will be noted that, for the sake of convenience, reference is hereafter made to a wheel as typical of a ground-engaging member. However, the term "wheel," unless the context precludes, is intended to include specifically different landing elements, such, for instance, as a ski or a float. Normally the landing element contemplated is such as will be or can be mounted on a generally horizontal spindle transverse to the direction of movement of the aircraft, which by being journaled upon such spindle may be permitted to rotate or tilt angularly in the plane of the track of the wheel or other landing element.

The present invention is based primarily upon a unit in which the wheel is supported unilaterally, that is, by an arrangement of the working parts of the shock absorbing element on one side only of the plane of rotation of the wheel, which is the plane containing its track, though the same or a similar construction may with but slight modification be incorporated in a bilateral arrangement of the type shown in an application of Rowland Henry Bound, Serial No. 273,241, filed May 12, 1939, and copending herewith. Even though one such unilateral shock absorbing element were employed at each side of the wheel—being independent of one another, instead of interconnected and interrelated as in Serial No. 273,241—this would be a mere duplication, and still would not be outside the scope of this invention, for each such unilateral wheel mounting, though used in duplicate, would still, per se, incorporate the advantages and novel features of this invention. It is the flexibility and adaptability of the basic design hereof to uses and under conditions widely different, that constitutes one of its chief advantages.

The undercarriage structure is not per se a part of the present invention. It may be fixed or retractable, but in either case, in the operative or landing position, it should be rigidly dependent from the aircraft. It may or may not in itself incorporate shock absorbing means; preferably and normally it will not. Herein the undercarriage structure is represented only by one or more upright legs such as the leg 1. If two such legs are employed, as in Figure 7, these legs would be connected or cross braced in a known manner to form a frame of which the ground plan is transverse to the landing direction and to the track of the wheel 9 and tire T.

Figure 1:
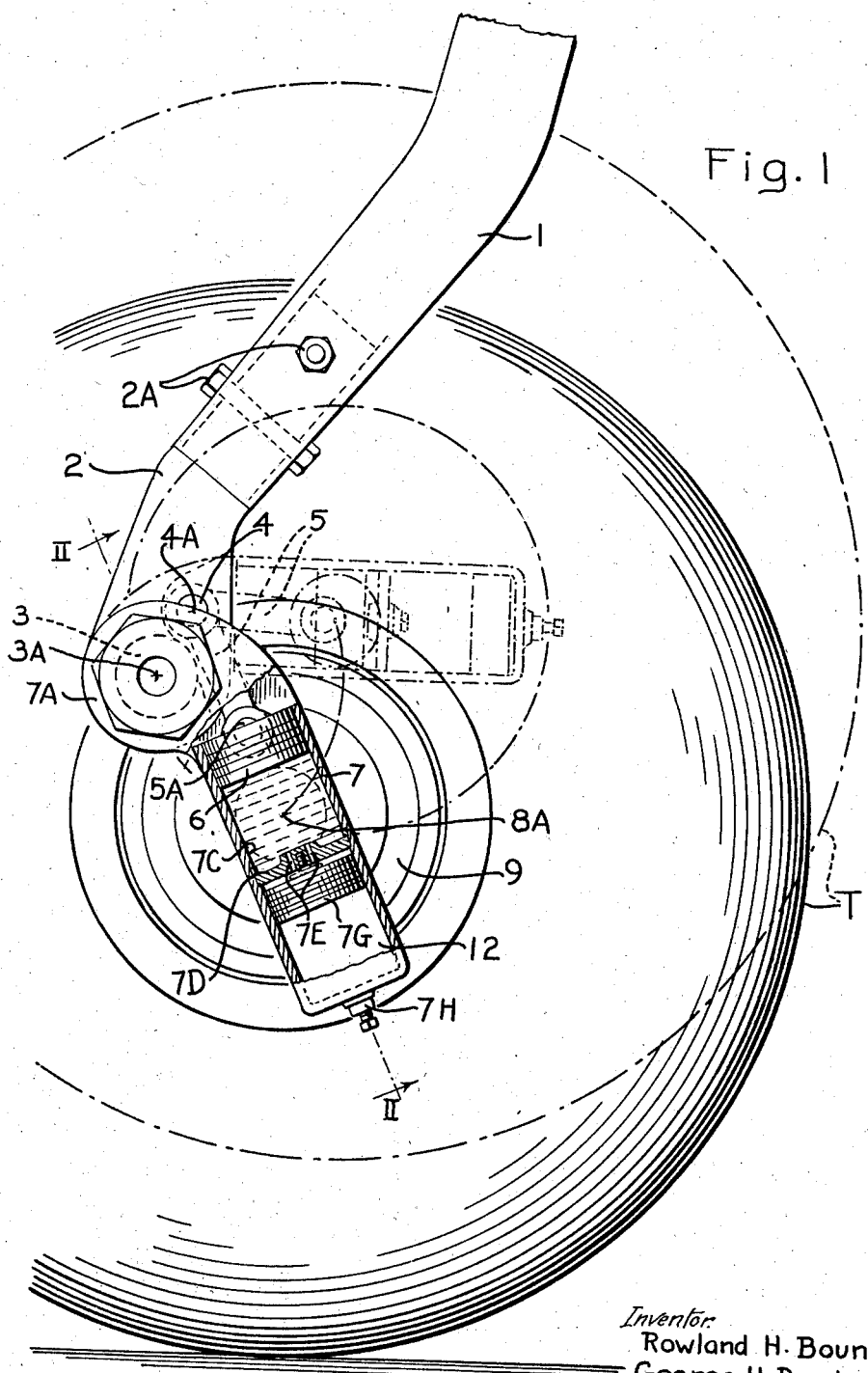
Figure 1 is in part a sectional view, with the remainder of the wheel and its mounting shown in side elevation, showing an illustrative form of the invention.
Figure 2:
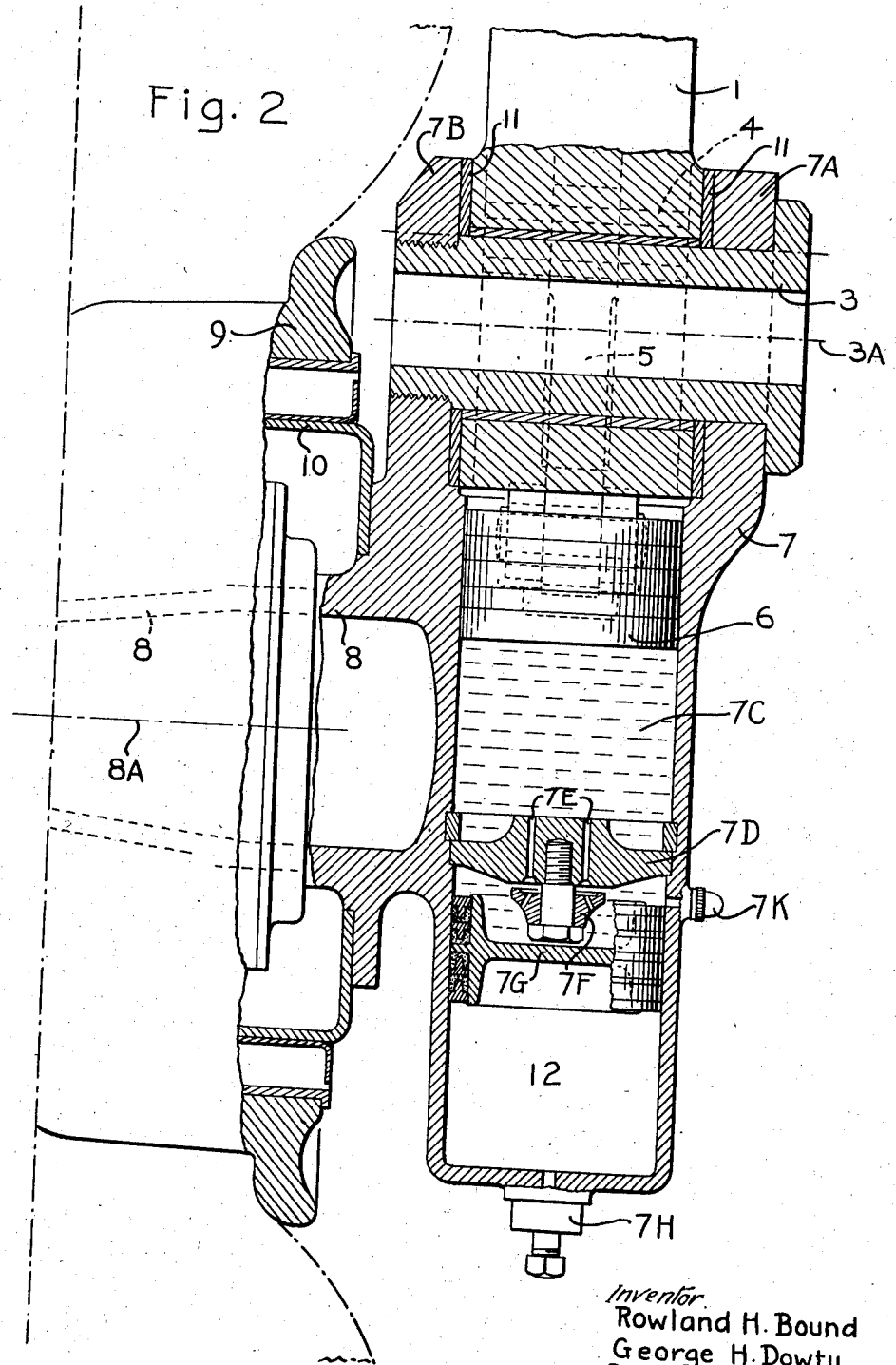
Figure 2 is an axial section substantially on the line 2—2 of Figure 1.

The leg 1, as shown in Figures 1 and 2, is tubular in form, and fitting within or surrounding its bottom end is a connector element 2, which is secured by pins or bolts 2a. The support 2 supports two joint pins, the lower pin 3 being a hollow one of large diameter, with its axis at 3A, and the upper pin 4 being shorter and slighter, and having its axis 4A parallel with the axis 3A. In general these axes 3A and 4A may be considered as vertically spaced, one being above the other, though they may also be offset to some degree in a forward and rearward direction. The support 2 is formed with a cavity to enable a link member 5 to be connected on the pin 4. The link is a piston connection, and its other end is connected by a gudgeon pin 5A to a shock absorber piston 6, which piston, with its link 5, may be considered as an arm which is pivotally connected to the leg 1 at 4A, and which extends generally laterally therefrom.

The pin 3 attaches to the support 2 a second laterally extending arm or lever 7, which though somewhat curved or cranked extends substantially radially from the axis 3A, but which by reason of its curvature is also directed towards the axis 4A. This arm 7 is forked at one end to straddle the support 2, presenting two lugs 7A, 7B. The arm 7 is formed with an internal cylinder 7C, through the open end of which extends the link 5, and in which slides the piston 6. The one arm 7 with the cylinder 7C, and the other arm formed by the piston 6 and link 5, are thus interconnected and caused to swing together, each about its own pivot 3A or 4A. With the intervening portion of the leg, or of the support 2, they constitute a deformable triangle.

The cylinder 7C is divided transversely by a fixed diaphragm 7D, through which the only liquid passages are those shown at 7E, with which cooperate a damping or flow-restricting valve 7F, of well known character. In the end of the cylinder 7C, below the diaphragm 7D, is provided a floating or idle piston 7G, the purpose of which is to separate liquid above it from compressed air or other compressible fluid below it. The compressed air is introduced to any pressure required, and its pressure may be released, by means of a suitable valve provided at 7H in the end wall of the arm 7. Fluid may be drained, or a deficiency supplied, through a connection at 7K.

Integral with the lever 7 which carries the cylinder 7C, and extending laterally therefrom, is a wheel spindle 8. The axis 8a of this spindle and of the wheel 9 and its tire T, while being, of course, transverse to the direction of the wheel track and substantially horizontal, is parallel with the axes 3A and 4A. The wheel 9 is journaled upon the spindle 8, and fixed brake parts, such as 10, are mounted rigidly with the arm 7 and spindle 8. It will be seen that the arm 7 extends in effect radially from one end of the spindle 8, but the spindle is supported at one end only.

By such means, or by any equivalent means, there is formed a shock absorbing element which resists the relative longitudinal or sliding movement of the piston 6 within and relative to the cylinder 7C, which is caused by the upward swinging movement (and by the rebound) caused by landing or taxiing loads imposed upon the cylinder through the wheel spindle 8 carried thereon. The deformable triangle, constituted as indicated above, may move from the full line position of Figure 1 to the dash line position thereof, for example, and in so doing the movement of the piston within the cylinder creates resistance by reason of the forced passage of liquid through the small orifices, and due to the resistance of air compressed in the air chamber 12, behind the idle piston 7G, and rebound is damped by the valve 7F. This is the normal action of shock absorbing means, and any other equivalent means may be employed in lieu thereof, insofar as certain phases of the invention are concerned. Variation of the air pressure within the chamber 12, through the valve 7H, varies the resistance of the shock absorber to deflection, and thus adapts it to use under varying conditions of load, etc.

The operation of the described construction depends upon the angular oscillations of the arm 7 about the axis 3A. Such oscillations involve that the piston 6 slides in the cylinder 7C, either against the resilient resistance in the chamber 12 or by reason of it. The liquid, the flow of which is more or less resisted by the passages 7E and valve 7F, transmits the pressure between the working piston 6 and the air, on the opposite side of the idle or floating piston 7G, and acts as a damping medium.

In order that the frame may be adequate to transmit all the loads which are to be transmitted between the wheel 9 and leg 1, including torsional and side loads, the lugs 7A, 7B are preferably fitted against the sides of the support 2, with intervening bearings in the nature of thrust bearings such as the annular bushing plates 11.

Figure 3:
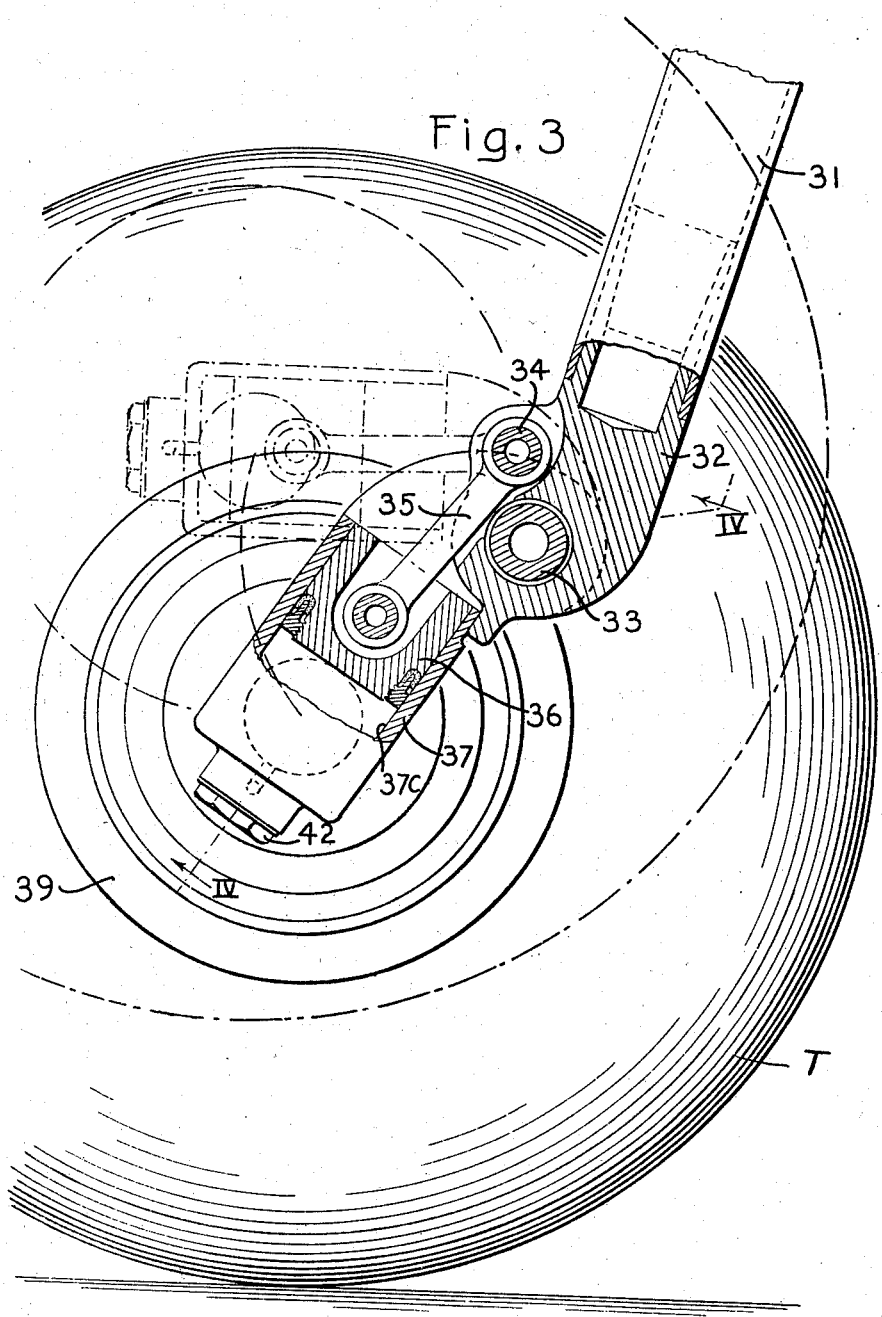
Figure 3 is a view similar to Figure 1, showing a modified form.
Figure 4:
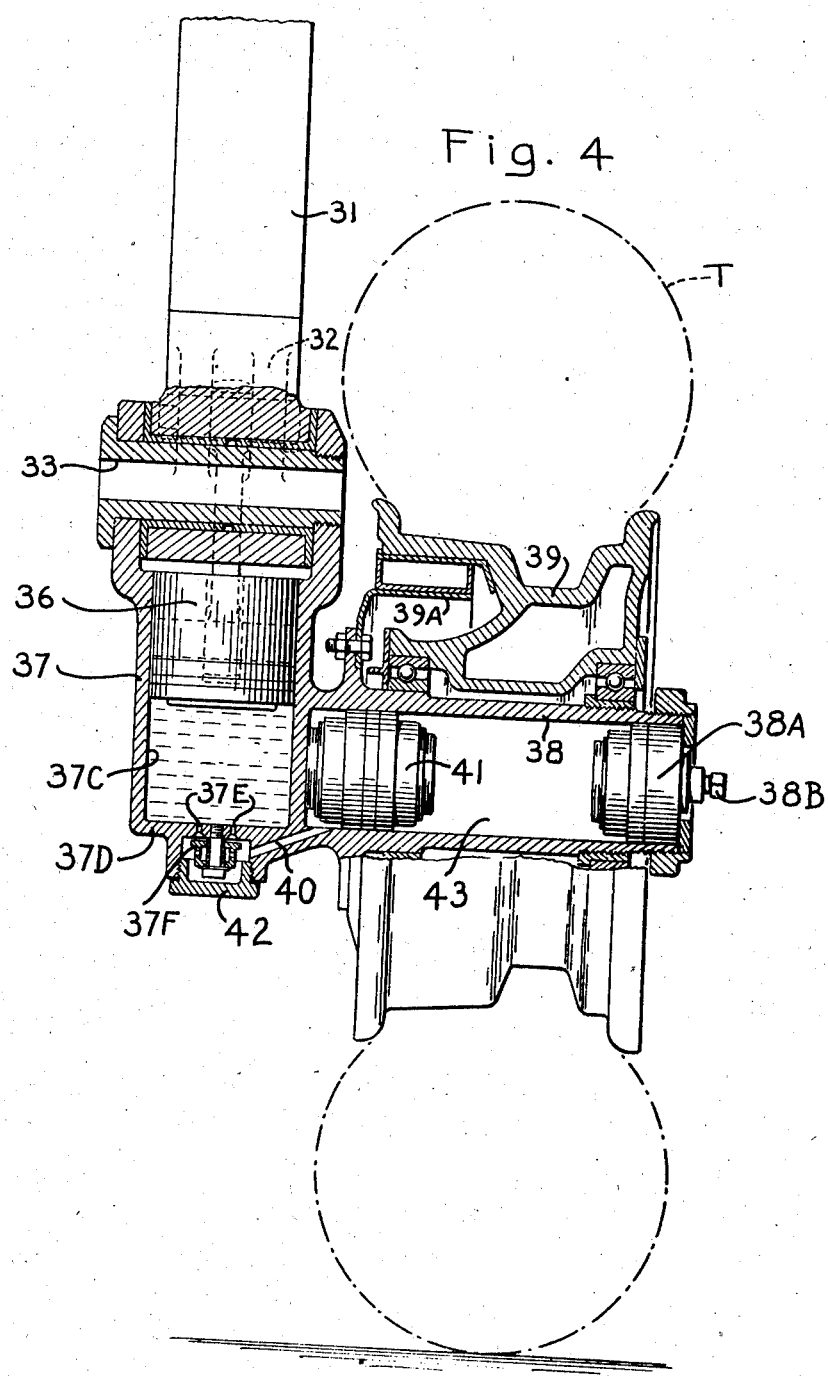
Figure 4 is a view similar to Figure 2, the section being on the line 4—4 of Figure 3.

Turning now to Figures 3 and 4, an arrangement is shown which is generally very similar to that of Figures 1 and 2, but in which the shock absorber means is, so to speak, split up. One advantage of this change is to shorten the length of the arm which bears the cylinder, so that greater ground clearance and less angular inertia can be obtained. The factor of ground clearance may be important if a flat tire is considered. In this example the leg 31 carries a support 32 with two pins or pivotal supports 33 and 34, connecting, respectively, an arm 37 and a link 35 with piston 36, all substantially as in the form of Figures 1 and 2. In this case the cylinder 37C is shorter and terminates at an end wall 37D, perforated with liquid passages 37E, with which cooperates a damping valve 37F, housed within a chamber closed by a removable pressure-tight cap 42. The space between the end wall 37D and the cap 42 communicates by a duct 40 with the hollow interior of the spindle 38, which preferably is also cylindrical. The spindle 38 extends, as before, laterally from the cylinder bearing arm 37, and substantially at an end of the latter. Upon the spindle 38 is borne the wheel 39, with which fixed brake parts 39A cooperate, these brake parts being supported by the spindle 38.

Within the cylindrical hollow interior of the spindle 38 is an idle or floating piston 41, disposed coaxially of and movable axially along the hollow spindle. The purpose of this free piston 41 is to separate liquid entering through the duct 40 from the compressed air which is introduced into the chamber 43 through a connection at 38B, which in this instance is formed in a removable end wall 38A of the spindle 38.

It will be observed that the flow-restricting valve 37F is so located, at the junction between the cylinder 37C and the spindle 38, that access thereto may easily be had merely by removal of the cap 42, which is out in the open and readily accessible. Upon removal of this cap the liquid may run from the interior of the cylinder 37C, but air pressure within the chamber 43 will not be lost, inasmuch as the free piston 41 will merely move to the left end of the hollow spindle, where it will stop, and where it will hold the air pressure within the chamber 43. Upon completion of the inspection or repair or renewal of the valve 37F, the cap may be replaced and the cylinder 37C may be recharged with fluid (the piston 36 being at such times held retracted), whereupon the apparatus is immediately ready for use in the same manner as before.

The action of the arrangement is, in effect, as described in connection with the form shown in Figures 1 and 2. In detail, however, it may be observed that the damping liquid, displaced by the piston 36 from the cylinder 37C, passes through the ports 37E, past the valve 37F, through the duct 40, and so against the piston 41, which it can move against the resilient resistance of the compressed air or like fluid within the chamber 43. This occurs when the wheel 39 is urged upward by landing or taxying loads, the converse, of course, occurring when decrease of ground loads allows the compressed air to return the liquid, but undue rebound is checked by the valve 37F.

The dimensions of the cylinder 37C and the air chamber 43 are, of course, proportioned so that the displacement from the one can be accommodated in the other. The piston 41 is formed so that it can abut against the ends of its cylinder without cutting off the exercise of fluid pressure upon either side of the piston.

Figures 1 and 3 (in both of which the direction of landing is intended to be to the left) illustrate another point in connection with the employment of the invention, namely, that the wheel 9 or 39 may "trail" or "lead" in relation to the leg 1 or 31, respectively. In the former case the wheel mounting may as a whole be regarded as being in tension in respect of drag load on the wheel, and in the latter case in compression. In both described cases, as regards vertical load, the lower arm is a tension member, and the arm comprised by the link and piston is a compression member. By reversing the vertical positioning of the axes 3A and 4A (or those corresponding in Figures 3 and 4), and by rearranging the piston and details connected therewith, the cylinder-bearing arm may be made the compression member in the triangulation.

In each of these examples it is to be observed that the wheel support is unilateral, and it should be self-evident that the constructions are adapted to being employed with a single cantilever leg or an undercarriage structure arranged to support the wheel unilaterally, not forgetting the possibility of using duplicate unilateral supports, as previously pointed out.

Figure 5:
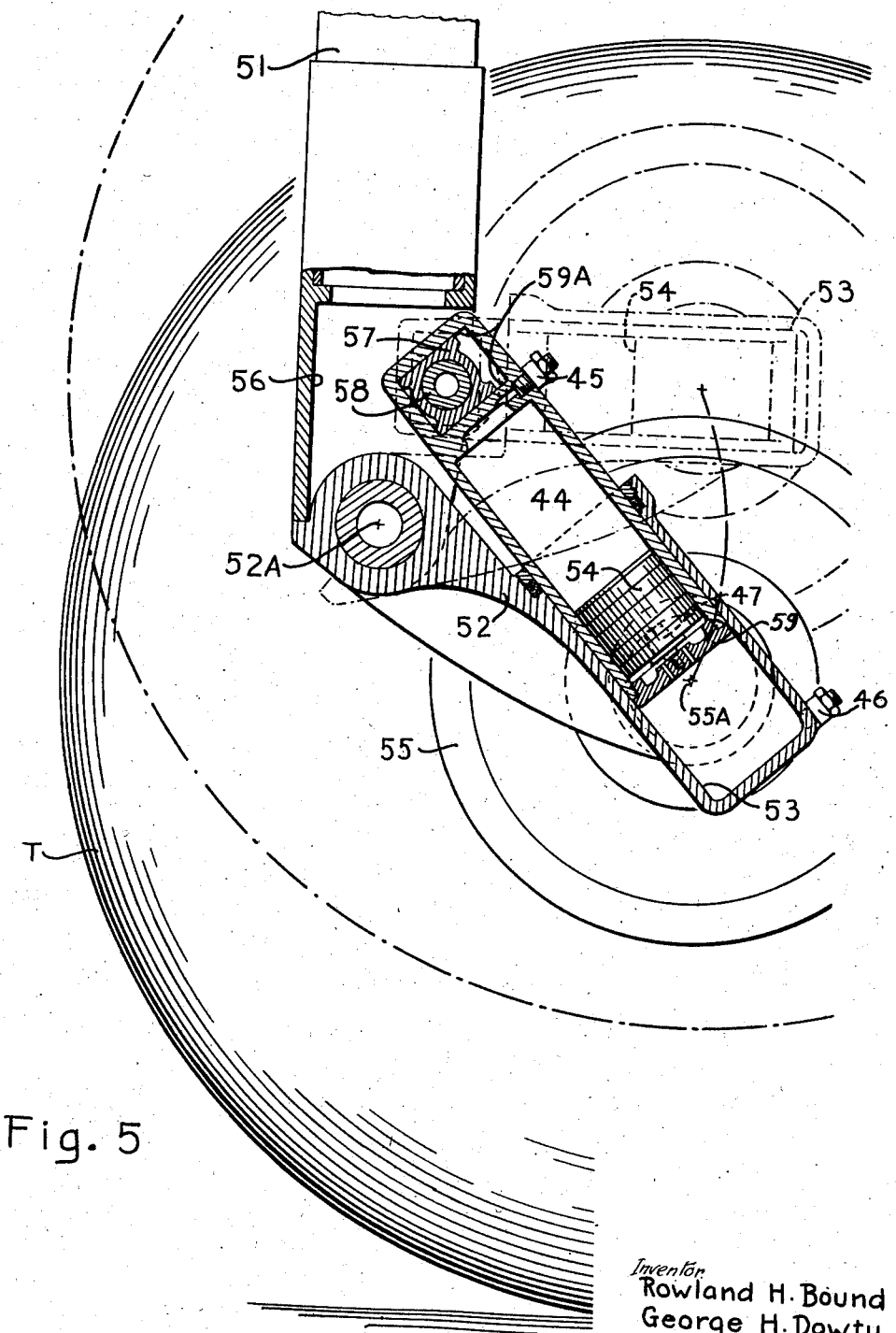
Figure 5 is a view similar to Figure 1, illustrating a transverse sliding connection between the piston and its pivotal mounting upon the leg, the piston being also illustrated as hollow.

The form shown in Figure 5 embodies the same principles, but includes the provision, between the piston and the support or undercarriage leg, of a sliding connection with some angular freedom instead of the link connection previously described.

Upon the lower end of the rigid leg 51 is pivotally attached the arm 52, on the axis 52A. This arm 52 embodies the fluid-filled shock absorber cylinder 53. A piston 59 works in this cylinder, displacing liquid therefrom into an air chamber 44, whenever the arm 2 is caused to swing upward by the incidence of landing load on the wheel 55, which is borne on a spindle extending laterally from the arm 52 on the axis indicated at 55A, as in the previous examples. The spindle may contain the compressed air against which the liquid displacement takes place, or, as shown herein, the piston 59 is itself hollow and cylindrical interiorly to provide an air chamber 44, the compression in which may be regulated by a valve 45. A free or idle piston 54 slides within this air chamber 44, separating the air within it from the liquid which is displaced from the interior of the cylinder 53, past the flow-restricting valve 47. In this way the piston itself may constitute the air chamber.

Fluid may be maintained or replaced within the cylinder by a filler opening 46 in this form.

The piston 59 must, of course, share the angular deflections of the arm 52. It is also required to be connected to the leg 51 so as to react thereon at a point spaced vertically from the axis 2A. This is accomplished as follows: the piston 59 extends clear out of the cylinder 53 and into a cavity formed at 56 in the leg 51, in which cavity the end of the arm 52 is formed with a guideway 59A, in the nature of a rectangular frame or slot. In this guideway is slidably mounted a trunnion block 57, which is rotatably mounted on a pin 58 which is rigidly mounted in the leg 51, with its axis parallel with axis 52A. The block 57 has endwise clearance in the guideway 59A, that is, it can travel therein transversely to the longitudinal axis of the piston 59, and also in a plane transverse to the axis of the pin 58. The pin 58 affords angular freedom and the sliding of the trunnion affords sliding freedom between the piston 59 and the leg 51, both freedoms being in the plane in which the arm 52 swings.

Figure 8:
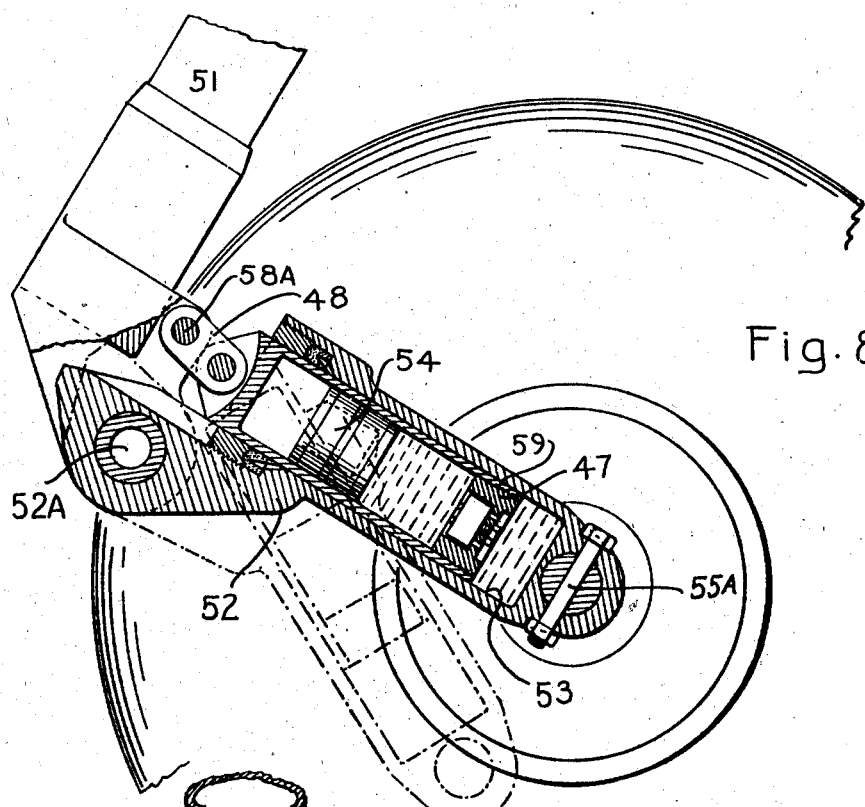
Figure 8 is a view similar to Figure 5, illustrating a similar arrangement, and Figure 9 may be considered a rear elevation of the same.
Figure 9:
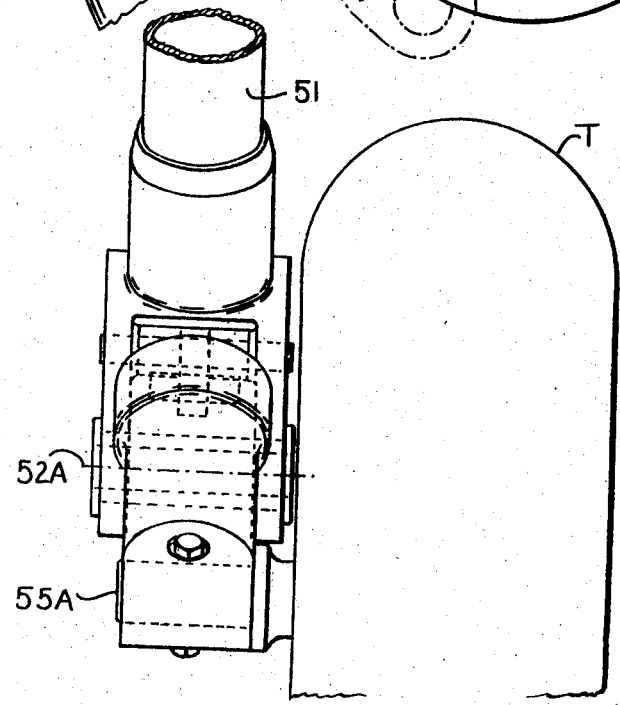

In Figure 8 the arrangement is the same as the form shown in Figure 5, in the respect that the piston is hollow, and constitutes the air chamber. It differs from the latter, however, principally in that a link 48 is interposed between the pin 58A on the leg and the projecting end of the piston 59.

It is occasionally desirable to mount such a structure, primarily designed and intended for unilateral mounting, and capable, alone, of absorbing all stresses arising in use, by a bilateral mounting, as has already been pointed out, or to an undercarriage which was designed for a bilateral wheel mounting. By the arrangement to this end which is shown in Figures 6 and 7 it is unnecessary to alter in any radical way the structure of the unilateral mounting, it being adapted for connection to a wheel which would normally be larger for bilateral mounting, and for support in a bilateral manner, but with the shock absorbing means interposed only at one side between the wheel mounting and the undercarriage structure, if this gives adequate springing, or in duplicate if additional springing is required. In this aspect the present form may be regarded as comprising an auxiliary device adapted to be employed with a bilateral mounting. In another aspect the invention can be regarded as comprising a mounting which is bilateral, in a certain sense, in that there are connections between the wheel spindle and the supporting leg at both sides of the wheel, but which has only one unilaterally disposed shock absorber (or, in the previously described sense, two independent but opposite unilateral shock absorbers). One advantage of thus adapting a unilateral mounting to a bilateral support is the advantage of making a single standardized form, which by such arrangements is adaptable even to a mounting which would ordinarily be required to be bilateral.

The undercarriage structure consists in essence of a rigid frame mainly comprised by a pair of parallel legs 61, 61A. To the leg 61 is connected, on the axis 62A, an arm 62, which is formed with an internal liquid-filled cylinder which operates a piston 63, connected by a link 63B to the leg 61 by a pivot with axis 63A. The axes 62A and 63A are spaced vertically apart. Integral with the arm 62 is the wheel spindle 64, which forms with the arm an L-shaped part. The interior of the spindle is cylindrically hollow to define an air chamber 77, and within it slides an idle piston 65, to separate liquid from compressed air. A duct 66 connects the cylinder in the arm 62 and the cylindrical air chamber 77 in the spindle, and a valve 78 is provided to control the flow of liquid between the cylinder 62 and the air chamber 77 at the right side of the piston 65, as seen in Figure 7.

The spindle 64 supports the landing wheel 67 on bearings such as 68, and also supports the non-rotating parts of brake mechanism.

The cylinder 77 within the spindle 64 is closed from one end by a plug element 69 through which there passes a tube 70 for introducing compressed air from an externally accessible valve or union at 71. The plug 69 is a pressure-tight fit within the spindle 64, and is dimensionally chosen to afford the required volume for air space within the spindle. The plug (which is held in the spindle by a screwed-in cap when the unit so far described is to be used as a unilateral mounting) is held in place by a spigot-like end 72 of a hollow spindle extension fitting 73. This extension fitting is provided internally with an annular bracket or wall at 73A to support the end of the tube 70. The spigot part 72 of the fitting 73 is fitted tightly in the spindle 64 and secured, for example, by studs 74. The extension of the spindle 64 constituted by the fitting 73 serves for the attachment of a second arm 75, which may be constructionally shaped substantially identically with the lever 62, since the shape and form is a sound one mechanically. The arm 75 is attached to the leg 61A by a pivot joint the axis of which is, geometrically, the axis 62A produced. The arm 75 may be a rotatable fit on the extension 73, or, as is preferred, will be rigidly secured thereto wherefore the parts 62, 64, and 75 constitute a rigid, U-shaped entity. The arm 75 may be integral with a spigot, such as 72, if desired, so that no spindle extension is required. The union or valve at 71 is left accessible through the hollow interior of the fitting 73.

It will be appreciated from the foregoing that the wheel mounting, comprising the parts 62, 64, the shock absorber unit, and the link 63B, is a complete unit in itself, capable of being employed alone as a unilateral arrangement. Such a unit is typical of the kind previously described. The arm 75 is termed a dummy lever, because although it renders the mounting bilateral from the point of view of support, and transmits a share of certain kinds of loads between the wheel 67 and the undercarriage structure 61, 61A, it has no shock absorber means directly associated with it. The construction enables a mounting unit which is constructed and adapted to be used primarily as a unilateral one for attachment to a single undercarriage leg, to be used when desired as a bilateral one attached to a double leg, such as the well known H-frame type of undercarriage structure. Thus the invention in this form contributes to the requirements of standardization.

It is believed that it will now be clear wherein the invention as a whole, and in all forms, contributes to the requirements of standardization and adaptability to a wide variety of installations, uses, and conditions, yet in forms which are largely standard, simple, and economical, both as to manufacture and as to weight.

What we claim as our invention is:

1. In aircraft alighting gear, in combination, an upright undercarriage leg, two arms projecting laterally from and pivotally mounted by parallel axes upon the leg, at points spaced one above the other, means constraining the swinging ends of the arms to swing conjointly, to constitute, with the intervening portion of the leg, a deformable triangle, said latter means including a cylinder formed on one such arm, and a piston fitting therein and movable with the other arm, a wheel spindle fixed upon and projecting laterally from the cylinder, parallel to the two pivot axes, and means associated with the piston and cylinder to resist their relative longitudinal movement accompanying swinging of the arms, under the influence of landing and taxying loads.

2. In aircraft alighting gear, in combination, an upright undercarriage leg, two arms projecting laterally from and pivotally mounted by parallel axes upon the leg, at points spaced one above the other, means constraining the swinging ends of the arms to swing conjointly, to constitute, with the intervening portion of the leg, a deformable triangle, said latter means including a fluid-filled cylinder formed on one such arm, and a working piston fitting therein and movable with the other arm, a wheel spindle fixed upon and projecting laterally from the cylinder, parallel to the two pivot axes, an air chamber in communication with the compression end of the cylinder, an idle piston separating the pressure fluid from the air in said air chamber, and means interposed between the working piston and the idle piston to govern longitudinal movement of the working piston within its cylinder, arising from swinging of the arms under the influence of landing and taxying loads.

3. The combination of claim 2, wherein the air chamber constitutes an axial extension of the cylinder, and both lie alongside a wheel carried upon the spindle.

4. The combination of claim 2, wherein the spindle is hollow and constitutes the air chamber, the cylinder lying alongside a wheel carried by the spindle, and communicating with the adjacent end of the air chamber.

5. The combination of claim 2, wherein the means to govern longitudinal movement of the working piston includes a ported diaphragm between the cylinder and the air chamber, and a damping valve controlling flow through the ports thereof.

6. In aircraft alighting gear, in combination, an upright undercarriage leg, two arms projecting laterally from and pivotally mounted by parallel vertically spaced axes upon the leg, one arm being formed with a longitudinally extending cylinder, and the other arm including a working piston movable within the cylinder, and constraining the arms to swing conjointly, by vertical movement of their swinging ends, a cylindrical air chamber laterally directed from and supported by the cylinder, an idle piston slidable within the air chamber, and dividing it into two non-communicating compartments, a fluid passage connecting the cylinder with one such compartment, and means interposed between the cylinder and the idle piston to govern passage of fluid from the cylinder into the chamber, under the influence of longitudinal movement of the working piston within the cylinder, caused by upward movement of the swinging ends of the arms under the influence of landing and taxying loads, and damping reverse or rebound movements.

7. The combination of claim 6, wherein the fluid-governing means is disposed at the end of the cylinder, the cylinder having a removable end closure, affording access to said fluid-governing means when removed.

8. The combination of claim 6, including also a rotative wheel bearing surrounding the spindle, and parallel to the axes of the two arms upon the leg.

9. The combination of claim 2, including a third arm at the opposite end of and supporting the wheel spindle, in conjunction with the cylinder-bearing arm, said third arm being pivoted to the undercarriage leg upon an axis coaxial with the pivot support of the cylinder-bearing arm.

10. A resilient wheel mounting comprising a wheel spindle, two upright legs, two arms pivotally mounted upon the respective legs upon co-linear axes, and extending laterally, each arm being rigidly secured to and supporting the spindle at their swinging ends, for vertical swinging movement under the influence of landing and taxying loads, a third arm pivotally mounted upon only one such leg and extending laterally, and connected at its swinging end to that one of the first two arms which is connected to the same leg, whereby the connected arms rise and fall together, and move relatively longitudinally, and shock absorber means interposed between the two interconnected arms, and operable by reason of their relative longitudinal movement.

11. A resilient wheel mounting comprising a dependent support, a lower arm pivotally mounted upon and extending generally laterally from the support, an upper arm pivotally mounted upon the support, upon an axis parallel to and spaced above the first, and extending generally laterally from the support, a spindle carried by and projecting laterally from one such arm, a fluid-filled cylinder carried by the same arm, and directed generally towards the pivot axis of the other arm, such other arm being formed as a piston slidable within the cylinder, and connected to the support by a connection affording transverse movement to compensate for the different arcs of swing of the two arms, and means governing movement of the fluid under the influence of longitudinal movement of the piston, due to landing and taxying loads.

12. A resilient wheel mounting comprising a dependent support, a lower arm and an upper arm each pivotally mounted upon and at points spaced apart along said support, and each extending generally laterally, a cylinder formed upon one such arm and a piston slidable therein and constituting part of the other such arm, and joining said arms to swing together, a hollow wheel spindle carried solely by the swinging end of the cylinder bearing arm, a port affording communication between the cylinder and the interior of the spindle, a flow-restricting valve interposed between the cylinder and the spindle interior, and a removable closure at the junction between the cylinder and the spindle, and when removed affording access to the valve.

13. In aircraft alighting gear, in combination, a dependent undercarriage leg, two arms projecting laterally from and pivotally mounted upon the leg at points spaced one above the other, both of the pivot mountings being formed as a pin rigid with the leg and extending generally horizontally, and transversely of the ground track, a wheel support carried outwardly of the pivot mounting on one of the arms by a distance materially in excess of the spacing between the two pivots, the axis of said wheel support being substantially parallel to said pins, shock-absorbing means interposed between and resisting upward swinging of the two arms, interconnecting their swinging ends and constraining them to conjoint swinging, the arms and the intervening portion of the leg thus constituting a deformable triangle of which the intervening portion of the leg is the shortest side, and said shock absorbing means comprising a fluid-filled cylinder and a working piston therein, disposed alongside a wheel upon said wheel support, a fluid chamber in communication with the compression end of the cylinder, and means to damp longitudinal movement of the working piston within its cylinder, arising from swinging of the arms under the influence of landing and taxying loads, the whole being organized and arranged to afford vertical wheel travel materially in excess of the relative longitudinal movement of the working piston within its cylinder.

14. In aircraft alighting gear, in combination, an undercarriage leg, two arms projecting laterally from and pivotally mounted by parallel axes upon the leg, at points spaced one above the other, means constraining the swinging ends of the arms to swing conjointly, to constitute, with the intervening portion of the leg, a deformable triangle of which the intervening portion of the leg is the shortest side, wheel supporting means carried by one such arm, spaced outwardly of its pivot support upon the leg by a distance in excess of the spacing between the two pivot axes, shock absorbing means interposed between the two arms, to resist upward swinging of the arms under the influence of landing and taxying loads, said shock absorbing means including a fluid-filled cylinder disposed alongside the wheel and a working piston within said cylinder, and including also a springing chamber active to govern longitudinal movement of the working piston within its cylinder, arising from swinging of the arms under the influence of landing and taxying loads, the whole being organized and arranged to afford vertical wheel travel materially in excess of the corresponding relative longitudinal movement of the working piston within its cylinder.

15. The combination of claim 14, wherein the spindle is hollow and constitutes the springing chamber.

16. The combination of claim 14, wherein the springing chamber is formed as part of the cylinder, and, with the cylinder, lies alongside a wheel carried upon the spindle.

17. In aircraft alighting gear, in combination, an undercarriage leg, two arms projecting laterally from and pivotally mounted upon the leg at points closely spaced, a cylinder formed on the swinging end of one of the two arms, a piston movable with the other arm and fitting in said cylinder, wheel supporting means integral with and projecting from said cylinder, and means associated with the cylinder and piston to resist their relative longitudinal movement accompanying swinging of the arms under the influence of loading on said wheel supporting means.

18. In aircraft alighting gear, in combination, an undercarriage leg, two arms projecting laterally from and pivotally mounted upon the leg at points spaced by materially less than the length of either arm, means constraining the swinging ends of both arms to swing conjointly and generally vertically, to constitute, with the intervening shorter portion of the leg, a deformable triangular frame, shock absorbing and rebound controlling means interposed between the two arms, and disposed in part at least alongside the wheel, to resist upward swinging of the arms and their unrestrained downward swinging under the application and release of landing and taxying loads, said shock absorbing and rebound controlling means including a fluid-filled cylinder formed on the swinging end of one of the two arms, a piston movable with the other arm and fitting in said cylinder, for relative longitudinal movement as the triangle is deformed under the influence of application and release of landing and taxying loads, and flow-restricting means to govern such longitudinal movement, and wheel supporting means integral with and projecting from said cylinder.

19. The combination of claim 13, wherein the fluid chamber constitutes an axial extension of the cylinder, and both lie alongside a wheel upon the wheel support, said chamber being filled with air, and a separator therein interposed between the cylinder fluid and the chamber air.

20. The combination of claim 13, wherein the wheel support is formed as a hollow spindle, and constitutes the fluid chamber, filled with air, which communicates with the cylinder at the end of the chamber, and a separator freely movable within the chamber, interposed between the cylinder fluid and the chamber air.

21. The combination of claim 13, wherein the piston is hollow, and constitutes the fluid chamber.

22. The combination of claim 13, wherein the piston is rigid and alone constitutes one arm, and the pivot connection thereof upon the leg includes means permitting transverse movement of this end of the piston, to accommodate its swinging.

23. The combination of claim 13, wherein the wheel support is formed as a rigid spindle, and the arm supporting the same is rigidly connected thereto at one end, and including a third arm rigidly connected to and supporting the other end of the spindle, the third arm being pivoted to the undercarriage leg upon an axis coaxial with the pivot support upon the leg of the cylinder-bearing arm.

24. A resilient wheel mounting comprising a dependent support, a lower arm and an upper arm each pivotally mounted upon and at points spaced apart along said support, and each extending generally laterally, a cylinder formed as part of one such arm and a piston slidable therein and constituting part of the other such arm, and joining said arms to swing together, a hollow wheel spindle carried solely by and swingable with the cylinder-bearing arm, means providing a port affording communication between the cylinder and the spindle interior, and a valve associated with said port for restricting the flow between the cylinder and the spindle interior.

ROWLAND HENRY BOUND.
GEORGE HERBERT DOWTY.